Patented Jan. 29, 1924.

1,482,367

UNITED STATES PATENT OFFICE.

HARVEY G. ELLEDGE, OF BETHEL TOWNSHIP, NEAR PITTSBURGH, PENNSYLVANIA.

PRODUCTION OF CARBON DIOXIDE.

No Drawing.   Application filed December 28, 1922.   Serial No. 609,513.

*To all whom it may concern:*

Be it known that I, HARVEY G. ELLEDGE, a citizen of the United States, residing at Bethel Township, near Pittsburgh, in the county of Allegheny, State of Pennsylvania, have invented certain new and useful Improvements in the Production of Carbon Dioxide; and I do hereby declare the following to be a full, clear, and exact description of the invention, such as will enable others skilled in the art to which it appertains to make and use the same.

This invention relates to an improved method and composition for the production of carbon dioxide.

In producing carbon dioxide it has heretofore been the practice to effect a double decomposition reaction by treating an alkali-metal bicarbonate in the presence of water with a mineral or organic acid, for example, by treating sodium bicarbonate in water solution with sulfuric acid, with the resulting production of sodium sulfate, water and carbon dioxide. The use of acids in this way requires that the containers for the acid and the reaction chambers with which the acid may come in contact be made of acid-resisting material. Moreover, in some cases the evolution of carbon dioxide is accompanied with the giving off of by-products or decomposition products of the reaction, so that the carbon dioxide gas is apt to be contaminated with undesirable volatile impurities.

The improved method and composition of the present invention enable carbon dioxide to be generated without the handling of acids or acid reagents, and without contamination of the carbon dioxide with undesirable impurities.

The composition of the present invention is made up essentially of an alkali-metal bicarbonate and a neutral calcium salt such as calcium chloride.

Such a composition containing, for example, sodium bicarbonate and calcium chloride, will react in the presence of water to produce carbon dioxide, sodium chloride, calcium carbonate and water. Both the ingredients of the composition and the products of reaction are of a neutral character or free from any pronounced acid reaction, so that the use of acid-resisting material is unnecessary. Calcium chloride is a neutral salt and the transporting and handling of it and all compositions containing it, are not attended with the difficulties presented in transporting and handling strong mineral acids. Calcium chloride also presents advantages over solid organic acids in that it is neutral in character and can be obtained in large amount and at moderate expense. As commercially produced, calcium chloride contains a trace of calcium hydroxide, but it is free from acid reaction and is substantially non-corrosive under the conditions of use.

The sodium bicarbonate and calcium chloride are without effect on each other when water is absent, and the composition of the invention may therefore be made by mixing the ingredients together in the dry state in the proper proportion. Where thus mixed, the composition should be protected from contact with water and from access of atmospheric moisture. The dry composition can thus be placed in a waterproof container which will keep it dry, and the composition can be kept in this way for long periods of time without losing its effectiveness. In general, the proportions of calcium chloride and sodium bicarbonate should be about 1 to 2, that is, about one part by weight of calcium chloride to about two parts by weight of sodium bicarbonate.

In providing the new composition for different purposes, it may be provided in individual containers, each containing a suitable quantity for the specific purpose for which the composition is intended. For example, if the composition is to be used in self-pressure generating fire extinguishers, a mixture of about one pound of calcium chloride and one pound of sodium bicarbonate may be provided in a waterproof container for use in a two-gallon capacity fire extinguisher where a pressure of around 55–60 pounds per square inch is desired. For use in producing carbon dioxide for charging carbonated beverages, the composition may similarly be provided in a waterproof container using, for example, one part by weight of calcium chloride with two parts by weight of sodium bicarbonate and using a sufficient amount of the composition so that a predetermined amount of carbon dioxide will be generated when the composition is added to the water; or several such containers may be added to a single carbon dioxide generator.

In my investigations of the composition of the invention I have found that when one part by weight of sodium bicarbonate and 0.72 parts by weight of calcium chloride are caused to react (the ratio of two gram molecules of sodium bicarbonate to one gram molecule of calcium chloride) the yield of carbon dioxide will be approximately twice the volume of the water, being about 96 liters of carbon dioxide measured under standard conditions of temperature and pressure when one kilogram of sodium bicarbonate and 0.72 kilograms calcium chloride react in 50 liters of water. Owing to the solubility of carbon dioxide in water and the smaller volume which it occupies under superatmospheric pressure, it will be evident that the relative volume of carbon dioxide will be much less where the carbon dioxide is generated under pressure; but it will also be evident that the amount generated can be regulated by increasing or decreasing the amount of the composition used and that the carbon dioxide can be generated under widely varying conditions of pressure and temperature.

The composition of the invention is available for use generally in the production of carbon dioxide. It may be used, for example, as a fire extinguisher composition for use in self-pressure generating fire extinguishers, in producing carbon dioxide for carbonating beverages, and for other purposes. When used in carbon dioxide generators, the amount of the composition used can be varied depending upon the amount of carbon dioxide to be produced and the pressure which is desired. In generating carbon dioxide, for example, for carbonating beverages, the generator may be partly filled with water and one or more of the waterproof containers with the composition in them may be introduced into the generator, for example, by opening the containers and floating them on the water in the generator. The generator can then be closed and the contents of the container or containers caused to come in contact with the water, for example, by overturning the containers where they have been opened or by puncturing the containers where they have not been previously opened. The reaction of the composition in the presence of water gives off carbon dioxide rapidly, so that it is made available, for example, for carbonating beverages by conveying it to the carbonating tank or apparatus through suitable pipe connections, or for liquefaction by conveying it through a suitable purifying apparatus and then to the compressor and liquefying apparatus. Where the carbon dioxide is to be liquefied it should be previously dried or purified for, although the carbon dioxide is comparatively pure, it should be freed from water before liquefaction.

Where the new composition is used in the production of carbon dioxide it is possible, as above pointed out, to provide the composition in predetermined amounts, and in waterproof containers, such that it is necessary merely to open or puncture the container and permit the composition to come in contact with water to bring about the desired reaction and the production of carbon dioxide.

Where the composition is not provided in this way, the new method of generating carbon dioxide can nevertheless be carried out by providing either the sodium bicarbonate or the calcium chloride in a dry state and introducing it into a water solution of the other material; or the sodium bicarbonate and calcium chloride may be provided in predetermined quantities in separate containers. The calcium chloride may be separately dissolved in the water necessary for the functioning of the carbon dioxide generator, and the sodium bicarbonate provided in a waterproof container within the generator with means for breaking it open when the generation of carbon dioxide is desired. The dissolving of the calcium chloride in the water in the generator enables advantage to be taken of the anti-freeze properties of calcium chloride solution, and this is particularly desirable and advantageous when the generation of carbon dioxide is desired at temperatures below 0° C. Where such low temperatures are not encountered the sodium bicarbonate may be dissolved in the water and the calcium chloride provided in waterproof containers to be opened when the production of carbon dioxide is to take place.

When the composition is to be used as a fire extinguishing composition in combating oil fires it may advantageously have compounded therewith froth forming and foam stabilizing ingredients such as glue, saponin, "black liquor" (a by-product of wood pulp manufacture), licorice, quillia, tan bark residues and other vegetable extracts in order to produce a blanket of carbon dioxide foam to cover burning violatile liquids. In combating such fires the fire extinguishers may be large in size and mounted on trucks or in railroad cars and may be self-pressure generating or provided with pumps for forcing the solution of the composition or solutions of its ingredients to the place of application. Instead of providing the composition with its ingredients in admixture or adding one of the ingredients to a solution of the other, the separate ingredients may be separately dissolved and their solutions admixed with each other, for example, by discharging them through nozzles where intermittent commingling of the two liquids takes place. In fighting oil fires the two solutions may be separately supplied to the mixing nozzles by pumps, using regulated amounts of the solution of predetermined strength, and the froth forming and foam stabilizing ingredients previously dissolved in one or the other of the solutions or partly in each. By admixing the solutions while they are being discharged in this way, the main generation of carbon dioxide takes place to an important extent after the composition has been applied to the fire so that the foam blanket is generated without previous loss of carbon dioxide. When the composition is used in self-pressure generating extinguishers, the carbon dioxide held in solution by the pressure and that formed by further reaction after the composition leaves the extinguisher are relied upon for the froth formation.

Instead of using calcium chloride, the similar production of carbon dioxide can be effected with calcium nitrate and calcium acetate, although these are more expensive and for that reason are less advantageous for the commercial production of carbon dioxide according to the present invention.

It will thus be seen that the present invention provides a composition for the production of carbon dioxide which has certain advantages not obtained with materials formerly employed for this purpose; that the composition is free from acids and acid salts, and does not require the use of acid-proof apparatus; while the composition can be transported and handled without the difficulties involved in transporting and handling acids and acid compositions.

It will also be seen that the composition can be provided in sealed waterproof containers and in predetermined amounts, such that a predetermined amount of carbon dioxide can be produced therefrom. Waterproof containers of this character can advantageously be used as above described by introducing them into the generator so that they will float on the water and by perforating or puncturing the container or a readily puncturable portion thereof to permit the composition to come in contact with the water in the generator.

It will further be seen that the improved method of the invention can be carried out without using the previously prepared composition by providing the sodium bicarbonate and calcium chloride separately and dissolving one in the water to which the other is subsequently added when the desired production of carbon dioxide is to take place; and that this method of procedure has certain advantages, for example, the production of an anti-freeze solution when the calcium chloride is previously dissolved in the water.

The invention also includes, in addition to the new method and composition for generating carbon dioxide, an improved generator and method of operation in which the composition or certain of its ingredients are provided in a solid form and in a waterproof container such that the containers can be kept in contact with the water and punctured or opened by suitable means when the generator is to be operated.

I claim:

1. A composition for the production of carbon dioxide comprising an alkali-metal bicarbonate and a neutral calcium salt.

2. A composition for the production of carbon dioxide comprising sodium bicarbonate and calcium chloride.

3. A composition for the production of carbon dioxide and a foam blanket comprising sodium bicarbonate, calcium chloride and foam stabilizing ingredients.

4. A composition for the production of carbon dioxide comprising sodium bicarbonate and calcium chloride in a sealed waterproof container.

5. The method of generating carbon dioxide which comprises adding to water a composition containing sodium bicarbonate and calcium chloride.

6. The method of generating carbon dioxide which comprises causing calcium chloride and sodium bicarbonate to react in the presence of water.

7. The method of generating carbon dioxide which comprises causing solutions of calcium chloride and sodium bicarbonate to react.

8. The method of forming a foam blanket which comprises causing calcium chloride and sodium bicarbonate to react in water solutions containing foam stabilizing ingredients.

9. The method of generating carbon dioxide which comprises adding calcium chloride to a solution of sodium bicarbonate.

10. The method of generating carbon dioxide which comprises adding sodium bicarbonate to a solution of calcium chloride.

11. The method of generating foam blankets which comprises causing solutions of calcium chloride and sodium bicarbonate to react, one or both of said solutions containing foam stabilizing ingredients.

12. A carbon dioxide generator comprising a closed receptacle containing water and also containing soduim bicarbonate and calcium chloride, the sodium bicarbonate and calcium chloride being prevented from reacting with each other by enclosing at least one of these materials in a waterproof container within the generator until the generation of carbon dioxide is to take place.

13. A carbon dioxide generator comprising a closed receptacle containing water and also containing a mixture of calcium chloride and sodium bicarbonate in a sealed waterproof container whereby the opening of the container and the contact of water with the contents thereof will result in the generation of carbon dioxide.

14. The method of generating carbon dioxide which comprises supplying the generator with water and with calcium chloride and sodium bicarbonate, at least one of said materials (i. e. calcium chloride and sodium bicarbonate) being provided in a waterproof container, and the generation of the carbon dioxide being effected by opening the container and permitting the contents thereof to come in contact with the water.

In testimony whereof I affix my signature.

HARVEY G. ELLEDGE.